3,509,094
PROCESS FOR MAKING POLYCARBONATES
Alois M. Gemassmer, Leverkusen, Germany, assignor to Mobay Chemical Company, Pittsburgh, Pa., a corporation of Delaware
No Drawing. Continuation-in-part of application Ser. No. 536,473, Mar. 22, 1966, which is a continuation-in-part of application Ser. No. 221,316, Sept. 4, 1962. This application May 9, 1968, Ser. No. 728,049
Int. Cl. C08g *17/13, 53/00*
U.S. Cl. 260—47                                    9 Claims

ABSTRACT OF THE DISCLOSURE

A process for recovering solid polycarbonate from a solution thereof by mixing a polycarbonate solution free of solid polycarbonate with sufficient polycarbonate having a bulk density of from about 25 pounds per cubic foot to about 40 pounds per cubic foot to convert the entire resulting mixture substantially immediately into a solid mass.

---

This inveniton relates generally to polycarbonate plastics and more specifically to a novel and improved process for the recovery of solid polycarbonates from a solution thereof and is a continuation-in-part of copending application Ser. No. 536,473, filed Mar. 22, 1966, which is in turn a continuation of application Ser. No. 221,316 filed Sept. 4, 1962, both now abandoned.

Various methods for making polycarbonate plastics have been disclosed. For example, suitable processes are described in U.S. Patents 3,028,365; 3,043,800 and 3,043,802 and in Canadian Patents 578,795; 594,805 and 611,970. The process which has been most successful commercially so far involves the phosgenation of Bisphenol A [2,2-bis-(4-hydroxyphenyl)-propane] in a dilute methylene chloride solution by the process disclosed in U.S. Patent 3,028,365. The resulting polycarbonate can be shaped and molded but it must first be separated from the solvent.

Separation of the polycarbonate from its solvents by direct evaporation of the solvent is not commercially practical because the polycarbonate forms a sticky mass as the solvent is removed and such a sticky mass is very difficult to handle in processing equipment. One disclosed method of avoiding the formation of such a sticky mass of polycarbonate involves four steps before the polycarbonate is completely separated from the solvent. In the first step, a nonsolvent for the polycarbonate is added to a polycarbonate solution until it becomes cloudy because of precipitation of the polycarbonate. At this point, in a second step, a small quantity of solid polycarbonate is added as a nucleating agent to accelerate precipitation of the polycarbonate and the slurry is agitated for two hours. After precipitation, the precipitate is separated from most of the liquid phase, in a third step, by filtering, centrifuging or the like. Then in a fourth step, the powder is heated in an oven to remove any liquids remaining therewith. Such a process is not only disadvantageous because it is rather cumbersome and time consuming, but also because it is necessary to separate the nonsolvent from the solvent before either can be used again. Furthermore, in some instances, some of the polycarbonate is not precipitated which results in a noticeable loss in yield of product and also complicates the separation of the nonsolvent from the solvent.

It is, therefore, an object of this invention to provide a method for recovering polycarbonate as a solid from a solution thereof which is devoid of the foregoing disadvantages.

Another object of the invention is to provide a simplified process for recovering solid polycarbonate from a solution thereof.

A further object of the invention is to provide an improved process for recovering a polycarbonate plastic in granular form from a solution thereof, which process can be carried out in readily available equipment on a commercial scale.

A still further object of this invention is to provide a simplified process for separating a polycarbonate from its solvent without obtaining a sticky mass.

Generally speaking, the foregoing objects and others are accomplished in accordance with this invention by providing a process for recovering a polycarbonate as a solid from a liquid solution thereof wherein sufficient solid polycarbonate is mixed with the solution to convert the entire resulting mixture substantially immediately from a liquid phase into a solid phase. The resulting solid phase is preferably heated to evaporate any solvent and other liquids remaining with the solid polycarbonate to obtain a dry, substantially solvent-free polycarbonate powder. The amount of solid polycarbonate added to the liquid polycarbonate solution will vary with the concentration of the polycarbonate in the solution, but most often the amount of polycarbonate mixed with the liquid polycarbonate solution will always be in excess of about 10% by weight of the amount of polycarbonate solute in the solution and preferably above about 50% by weight of the amount by weight of polycarbonate solute in the solution. The solid polycarbonate added to or otherwise mixed with the liquid polycarbonate solution can be added either as dry powder or as a suspension in a suitable inert liquid medium provided that sufficient solid is always added to effect substantially immediate conversion of the liquid polycarbonate solution from a liquid phase into a solid phase having all of the solvent dissolved therein.

The polycarbonate powder produced by this invention will usually have a bulk density of from about 25 pounds per cubic foot to about 40 pounds per cubic foot. In addition, as illustrated by the working examples herein, the polycarbonate added to obtain the substantially immediate conversion of the liquid to the solid phase is also preferably a material having a high bulk density of from about 25 pounds per cubic foot to about 40 pounds per cubic foot. As a matter of fact, the high bulk density product of the instant process can even be recycled as shown in the working examples to act as the solid-inducing polycarbonate additive in accordance with this invention in the preparation of a solid polycarbonate product.

The polycarbonate product of this invention having a density within the range of from about 25 pounds per cubic foot to about 40 pounds per cubic foot is advantageous over products of other densities for use in most subsequent shaping operations, so it is preferred to produce such a product. The conversion of the liquid polycarbonate solution into a solid phase is apparently achieved primarily by absorption of solvent by the solid high density polycarbonate. The solid phase obtained in accordance with this invention will contain from about 1% to about 65% solvent which is removed by evaporation without passing through the sticky paste stage inherent in the prior art direct evaporation processes.

In a preferred emobdiment of the invention, a liquid polycarbonate solution and solid high bulk density polycarbonate are brought together continuously in a suitable vessel and the solid polycarbonate formed is continuously withdrawn from the vessel.

In one embodiment, the liquid polycarbonate solution and solid polycarbonate are mixed together in a mixer such as, for example, a sigma blade mixer or pug mill. In order to produce the desired friable mass, it is important that the mixture of solid polycarbonate with liquid polycarbonate solution be stirred or otherwise agitated to insure uniform dispersion of the solid polycarbonate in the liquid polycarbonate solution. After the liquid polycarbonate solution has been converted into a solid polycarbonate phase, the solvent remaining on the solid polycarbonate is removed by passing the solid polycarbonate through an oven or other suitable heated apparatus. The solvent removed from the solid polycarbonate by evaporation is condensed and recovered for subsequent polycarbonate preparation.

In another embodiment of the invention, solid polycarbonate is heated to a temperature of, say, from about room temperature to about 145° C. before it is mixed with the liquid polycarbonate solution. The liquid polycarbonate solution is also heated to a temperature of, say, from about room temperature to about 40° C. In this way, some solvent evaporates from the solution during the mixing, but the evaporation is controlled in such a way that sufficient solvent remains to prevent the formation of a sticky friable mass before conversion of the liquid polycarbonate solution into a friable solid mass.

The invention is applicable to the recovery of solid polycarbonate from any liquid polycarbonate solution. The concentration of the polycarbonate in the liquid polycarbonate solution can vary from just a very slight amount of 1% or less to a much greater concentration of up to about 30% by weight depending upon the temperature of the solution and other factors. The important feature is that the concentration must be such that the solution is a liquid and is not a sticky paste at the time the solid polycarbonate is added thereto.

As indicated heretofore, the amount of solid polycarbonate added to liquid polycarbonate solution will vary depending upon other conditions used in the process. As an example, if the solid polycarbonate is entirely free from liquids and thus is 100% polycarbonate powder, and it is desired to produce a friable mass of about 50% solid polycarbonate having about 50% by weight solvent absorbed thereon, the following amounts of solid polycarbonate would be added to ten parts of a solution of the indicated concentration.

5% polycarbonate solution—9
10% polycarbonate solution—8
20% polycarbonate solution—6
25% polycarbonate solution—5
30% polycarbonate solution—4

In order to further clarify and better describe the invention, the following are specific examples thereof:

Parts and percentages in the following examples are by weight unless otherwise specified.

EXAMPLE 1

About 800 grams of a substantially dry solid polycarbonate prepared by reacting 2,2(4,4'-dihydroxy diphenyl) propane and phosgene in accordance with the process of Example 1 of U.S. Patent 3,028,365 having a bulk density of about 29 lbs./ft.$^3$ are added to a sigma blade mixer having a three-quart capacity. This mixer is heated by means of steam heat applied to the jacket of the mixer. After the temperature of the solid polycarbonate reaches approximately 50° C., about 1125 grams of a solution of about 18% by weight polycarbonate in methylene chloride solvent is fed continuously to the preheated polycarbonate at a rate of 10 cc./min. The evolution of some methylene chloride vapor is immediately observed. The mixture increases in volume and when the mixer becomes full, granular solid polycarbonate begins to overflow from the mixing device which is operated at a partially tilted position (45°). The overflow contains approximately 95% polycarbonate and 5% methylene chloride. The friable mass thus obtained is heated in an oven to evaporate the methylene chloride therefrom.

EXAMPLE 2

About 800 grams of a dry solid polycarbonate (similar to that used in Example 1) is added to a sigma blade mixer of three quarts capacity. This solid polycarbonate is heated with steam applied to the jacket of the mixer until the temperature of the solid polycarbonate is approximately 60° C. When this temperature is reached, addition of 1125 grams of a liquid polycarbonate solution to the solid polycarbonate is begun. This 18% polycarbonate solution (using methylene chloride as the solvent) is fed to the heated solid polycarbonate with agitation. The feed rate of this 18% solution is 35 cc./min. The volume of the mixture increases and after a sufficient amount of solution is added to fill the vessel, the powder starts to overflow from the mixer which is operated in a partially tilted position. Upon finally drying the powder in a vacuum oven, it is found that the bulk density of the powder is about 37.5 lbs./ft.$^3$. The solid polycarbonate contents of the ground product as it is discharged from the mixer is found to be from about 80–90% solids. The friable mass thus obtained is heated to evaporate the methylene chloride therefrom.

EXAMPLE 3

A sigma blade mixer of three-quart capacity is charged at room temperature with 600 grams solid polycarbonate which is just sufficient to overflow when the mixer is operated at a 45° angle. The solid polycarbonate having a bulk density of about 35 lbs./ft.$^3$ contains approximately 95% polycarbonate and 5% methylene chloride. With the mixer in operation, a polycarbonate solution containing 18% polycarbonate and 82% methylene chloride is added continuously to the agitated powder at the rate of 10 cc./min. Simultaneously, continuous addition of dry solid polycarbonate (containing 5% methylene chloride) is started. The ratio of ingredients fed to the mixer is 1.57 parts of 18% solution per 1 part of solid polycarbonate (bone dry basis). This ratio is calculated to give a composition of 50% polycarbonate and 50% methylene chloride for the granular mixture overflowing from the mixer.

While adding the liquid polycarbonate solution, a friable mass formation occurs at the point where the solution enters the solid polycarbonate. The mixing action of the blades distributes the friable mass throughout the mixture. At the end of this time, the friable mass has broken up into small pieces sufficient to discharge the mixer.

The solid polycarbonate from the mixer, containing about 50% methylene chloride is charged to a tumble dryer. Steam is admitted to the jacket under 2½ to 3 atmospheres pressure. The vapors coming off the dryer are condensed for recovery of the methylene chloride. After about two hours, the dryer is discharged of material being essentially solvent free. Of the total, 77.8% of the polycarbonate having a bulk density of about 36 lbs./ft.$^3$ is recycled to the mixer where it is contacted with a fresh supply of 18% polycarbonate solution. The remaining 22.2% of the dryer discharge is the new solid polycarbonate product and is fed to a vented extruder-pelletizer for production of final product pellets.

The example described above is repeated at room temperature as a batch operation. The three-quart mixer in an untilted position is charged with 600 grams of solid polycarbonate containing approximately 5% methylene chloride. The amount of solid polycarbonate that is added must cover the blades of the mixer. With no heat applied to the jacket and the blades turning, 940 grams of an 18% polycarbonate-82% methylene chloride solution is rapidly added. After going through a friable mass stage as previously described, the material becomes progressively more granular until after about 7 minutes the mixer could be discharged easily by tilting.

EXAMPLE 4

The procedure of Example 3 is carried out using a polycarbonate solution resulting from conducting the phosgenation and polymerization reactions with ethylene dichloride rather than methylene chloride as the solvent.

The three-quart capacity laboratory sigma blade mixer is charged at room temperature with solid polycarbonate having a bulk density of about 33 lbs./ft.$^3$ and containing about 5% ethylene dichloride and 95% polycarbonate. The mixer is filled until the blades are just covered with powder. A polycarbonate solution containing 10% polycarbonate and 90% ethylene dichloride is fed into the agitated solid polycarbonate at the rate of 10 cc./min. The total quantity of 10% solution charged is previously calculated to give a final mixture containing 50% polycarbonate and 50% ethylene chloride. The quantities are 1 part of solid polycarbonate containing 5% solvent, (polycarbonate solid weight on bone dry basis) per 1.25 parts of 10% solution. While adding the 10% solution, the mixture goes through a friable mass stage. Within about ten minutes after the addition of solution is completed the mixture is no longer a friable mass but has broken up into small pieces and has the appearance of coarse damp sand with some agglomeration. The material is easily discharged from the mixer.

Drying is carried out in the steam heated tumble dryer described in Example 3. After drying the powder to 5% or less ethylene dichloride content, about 7.95 parts (bone dry basis) of the solid polycarbonate having a bulk density of about 35 lbs./ft.$^3$ is recycled to the mixer for each one part of solid polycarbonate sent forward to the extruder-pelletizer as net product.

EXAMPLE 5

Using the same three quart sigma blade mixer previously described dry solid polycarbonate having a bulk density of about 38 lbs./ft.$^3$ and containing about 5% ethylene dichloride is charged to the mixer with steam applied to the jacket of the mixer. The quantity of solid polycarbonate charged is sufficient to cover the blades. The mixer is turned on and heating continued until the temperature of the solids reached about 100° C. At this point an 18% polycarbonate solution in ethylene dichloride is fed into the agitated solids at the rate of about 35 cc./min. An immediate evolution of ethylene dichloride vapors is observed. The mixer is tilted to a 45° angle. After a short time the volume of the mixture in the mixer increases to the point where the mixture overflows continuously from the tilted mixer. The powder overflow contains up to 90% polycarbonate and 10% ethylene dichloride. This example demonstrates that starting with a "dry" heel of polycarbonate solids, polycarbonate from a solution may be deposited continuously while simultaneously evaporating the solvent. In this fashion, no external recycle of solids from a drying operation is necessary as in the previous examples of continuous processing.

The friable mass overflowing the mixer for convenience is dried in the tumble dryer previously described before extruding and pelletizing. In a commercial apparatus, the heat source for the mixer is adjusted to give the desired dryness (5% or less solvent) and thus eliminates the drying step altogether.

EXAMPLE 6

To determine the effect of which ingredient is added first, the following procedures are conducted in the three quart sigma blade mixer previously described in Example 1. About 800 grams of solution (25% polycarbonate in methylene chloride) is charged to the mixer. With the blades turning about 400 grams of substantially dry solid polycarbonate having a bulk density of about 30 lbs./ft.$^3$ is added rapidly to the mixer. For about 20 seconds, the solid polycarbonate remains undispersed and rides on the solution. After about 1½ minutes, the mixture progresses to a friable mass stage. After about 2½ to 3 minutes the mass becomes heavier and more viscous. At the end of 6 minutes, the mass breaks up into small lumps and the material may be easily discharged from the mixer.

The second run is made in which the order of addition of ingredients as above stated is reversed. The three quart sigma mixer is charged with 400 grams of substantially dry solid polycarbonate having a bulk density of about 30 lbs./ft.$^3$. With the blades turning, about 800 grams of polycarbonate solution (25% polycarbonate in methylene chloride) is charged quickly into the mixer. At first the solution remains clear and on top of the solid polycarbonate. Within 30 seconds to 1 minute after adding the liquid solution, the mixture is similar to the mass described in the previous above defined example. The friable mass goes through the same stage of becoming more viscous and finally breaks up into a granular nonsticky mixture which is easily discharged from the mixer. The total time to reach this stage is 7 minutes or nearly identical with the previous experiment in which the substantially solid polycarbonate is added to the liquid solution.

The concept of this invention includes preferred embodiments which are above illustrated by Examples 1–6. A further embodiment of this invention (as illustrated by Examples 7–15) involves contacting a polycarbonate solution with a substantially dry solid polycarbonate, mixing the two components to form a mass and subsequently working said mass until it begins to disintegrate into individual particles. These component portions then may be transferred to a drying means where the particles are dried and subsequently ground to the desired form. The amount of solid polycarbonate mixed with the solution remains critical as above discussed. By the process of this embodiment, polycarbonates can be recovered from a methylene chloride solution in a desirable form by simply charging substantially solid polycarbonate to the solution to form a friable mass. The solid polycarbonate absorbs methylene chloride from the solution, thus resulting in a friable mass which on further mixing breaks up into component particles. The process of this embodiment is adaptable to both batch type and continuous processes. It is quite apparent that as the concentration of the polycarbonate solution is increased, the amount of solid polycarbonate that must be added or recycled to give the desired friable mass will decrease. The time required for the mass to break up sufficiently for grinding and further processing increases as the solid content of the mass decreases. The solid polycarbonate that is charged to or contacted with the polycarbonate solution should be low in solvent content, preferably, not greater than 5% solvent. The liquid polycarbonate solution used may range from a 1% polycarbonate solution to a solution where the viscosity is so high that it will just flow. When the substantially dry solid polycarbonate is added to this liquid polycarbonate solution, the final concentration of polycarbonate in the friable mass leaving the mixer should contain from about 1 to about 65% methylene chloride solvent. The following examples define further modifications in the above illustrated processes.

EXAMPLE 7

About 100 lbs. of a starting 20% polycarbonate liquid solution in methylene chloride made by the phosgenation of 2,2(4,4'-dihydroxydiphenyl) propane is mixed in a Baker-Perkins sigma mixer (any heavy duty mixer may be used) with 60 lbs. of substantially dry solid polycarbonate having a bulk density of about 37 lbs./ft.$^3$ at room temperature. The solid polycarbonate alternatively may be made by any of the above noted methods. The solid polycarbonate and the 20% polycarbonate solution are mixed in the sigma mixer for about 10 minutes. A friable mass is formed which upon analysis is 50% polycarbonate and 50% methylene chloride solvent. Upon working for about 7 minutes, the mass will break up into individual particles.

These individual particles may be dried to a substantially solvent free state and further ground up to give particles of desired size or may be used as such in further processes. For example, in a continuous system, a portion of individual particles or a ground portion of these individual particles is recycled to the source of the solid polycarbonate and contacted with a fresh supply of the 20% polycarbonate solution whereby a further friable mass product is formed. This mass again disintegrates upon agitation and a portion is dried and recycled to the source of solid polycarbonate to be again added to the liquid polycarbonate solution. This process is repeated as often as desired in the continuous process.

The percent polycarbonate in the friable mass formed is varied by using various concentrations of liquid polycarbonate solution. The residence time in the heavy duty mixer is fixed by the desired concentration of polycarbonate in the friable mass as discharged. For example, in the above process of this example, a 40% polycarbonate friable mass requires a 40 minute residence time, a 50% polycarbonate mass requires 10 minutes and a 60% polycarbonate mass requires 4 minutes.

EXAMPLE 8

The process of Example 7 is repeated using a starting 10% polycarbonate solution in methylene chloride rather than the 20% solution as used in Example 7. After about 10 minutes mixing, a 50% polycarbonate friable mass is formed upon the addition of 8 parts of dry solid polycarbonate to 10 parts of the liquid solution.

This process is repeated using a starting 25% polycarbonate solution and a 30% polycarbonate solution. Using the 25% polycarbonate solution: about 50 parts (dry basis) of a 95% polycarbonate solid is added to about 100 parts of this 25% polycarbonate solution and is mixed in a sigma mixer for about 12 minutes. After mixing, a 50% polycarbonate friable mass is formed which disintegrates into small portions after working for about 7 minutes. These small portions are passed to a grinder where they may be ground into a powder. This powder is dried by conventional means to less than about 5% solvent content. The amount of recycled solid polycarbonate is 66.7%. This is added to a fresh supply of 25% polycarbonate starting solution. This process is repeated as many times as desired for a continuous process. A 96–100% solid polycarbonate used together with the 25% polycarbonate starting solution gives similar results to the above process of this example.

Using a 30% polycarbonate starting solution, the same process is followed as in the 25% polycarbonate starting solution, 40 parts of a substantially dry solid polycarbonate is mixed with 100 parts of the 30% solution. About 57% of the ground dried resulting product is recycled to a fresh supply of the 30% polycarbonate solution in a continuous process.

EXAMPLE 9

The process of Examples 7 and 8 are repeated using starting solutions of 10%, 20%, 25% and 30 polycarbonate in ethylene dichloride solvent. The processing conditions required upon the addition of powder to form a friable mass are as follows:

TEMPERATURE OF ABOUT 20° C.

| Percent polycarbonate in starting solution | Percent polycarbonate in dry solid | Parts of polycarbonate in friable mass formed | Parts of friable mass recycled/ 10 parts of solution |
|---|---|---|---|
| 10 | About 100 | 50 | 8 |
| 20 | do | 50 | 6 |
| 25 | do | 50 | 5 |
| 30 | do | 50 | 4 |

EXAMPLE 10

About 52.7 lbs. of a 10% polycarbonate-methylene chloride solution is passed per hour into a filtering means. The 10% polycarbonate solution is maintained at a temperature of about 20° C. After being filtered this solution is passed to a falling film evaporator maintained at a temperature of about 40° C. Some methylene chloride solvent is evaporated from the 10% solution until approximately a 25% polycarbonate and 75% methylene chloride solution results. This solution is then collected in a surge tank or collection tank. About 90 lbs. of this solution is charged to a 50 gallon sigma mixer. To the same mixer is added about 45 lbs. (dry basis) of a solid polycarbonate. This solid polycarbonate has a bulk density of about 35 lbs./ft.$^3$ and contains approximately 95% polycarbonate and 5% methylene chloride. The two components are mixed for approximately 10–12 minutes and a friable mass is formed. Additional solid polycarbonate is added to this friable mass until the mass begins to break up or disintegrate into small chunks. This mass is then discharged from the mixer, ground, and charged to a tumble dryer. The tumble dryer is closed and the rotation is started. Steam is admitted to a heating jacket around the dryer under 2½ to 3 atmospheres pressure. The vapors coming off the dryer are condensed and recovered and subsequently fed to a methylene chloride recovery vessel. After about 2 hours of tumbling, the dryer is stopped and steam is shut off and the product is discharged. About 45 lbs. of the product having a bulk density of about 34 lbs./ft.$^3$ is recycled to the mixer where it is contacted with a fresh supply of 25% polycarbonate solution. The additional remaining polycarbonate product is fed to a collection means where it is further dried and packaged.

EXAMPLE 11

About 10 parts of a 10% polycarbonate solution maintained at a temperature of about 20° C. is fed directly to a heavy duty sigma mixer. To the same mixer is added 8 parts of a solid polycarbonate (bone dry basis) having a bulk density of about 37 lbs./ft.$^3$ and comprising approximately 95% polycarbonate and 5% methylene chloride. The two components are mixed and in approximately 10 to 12 minutes a friable mass is formed and is broken up into small chunks. This mass is discharged from the mixer, ground and charged to a tumble dryer. The tumble dryer is heated and rotated, and vapors coming off from the dryer are condensed for recovery of the methylene chloride. After approximately 2 hours of tumbling, the dryer is stopped and the product is discharged from the dryer. Of the recovered product ⅚ having a bulk density of about 36 lbs./ft.$^3$ is recycled through the sigma mixer where it is contacted with an additional fresh supply of the 10% polycarbonate solution. The additional ⅙ of the polycarbonate product recovered from the dryer is passed to a storage means where it is further dried and then packaged.

EXAMPLE 12

A 10% polycarbonate solution containing 10% polycarbonate and 90% methylene chloride which is maintained at a temperature of about 20° C. is passed into a falling film evaporator maintained at a temperature of about 40° C. This solution is concentrated in the evaporator to a polycarbonate solution having approximately 20% polycarbonate and 80% methylene chloride. The solution is collected in a surge tank. About 90 lbs. of this solution is charged to a 50-gallon sigma mixer. To the same mixer is added about 54 lbs. of solid polycarbonate (dry basis) from any desirable supply source. This solid polycarbonate has a bulk density of about 38 lbs./ft.$^3$ and contains approximately 95% polycarbonate and 5% methylene chloride. The two components are mixed and in approximately 10 to 12 minutes a friable mass is formed which on standing breaks up into small chunks. This mass is discharged from the mixer and charged to a tumble dryer. The tumble dryer is closed and rotation started. Steam is admitted to a jacket surrounding this dryer under 2½ to 3 atmospheres pressure. The vapors coming off the dryers are condensed for recovery of the methylene chloride. After approximately two hours, the dryer is stopped and the product is discharged. About 54 lbs. (dry basis) of the resulting product having a bulk density of about 39 lbs./ft.$^3$ is recycled to the sigma mixer where it is contacted with an additional fresh supply of the original 20% polycarbonate solution. The remaining polycarbonate product recovered from the dryer is then passed to a collection point where it is dried and then may be stored or packaged.

EXAMPLE 13

A polycarbonate solution containing approximately 20% polycarbonate and 80% methylene chloride is collected in a surge tank. About 10 parts of this polycarbonate solution is added to a 50-gallon sigma mixer. To the same mixer is added about 6 parts of a solid polycarbonate (dry basis) having a bulk density of about 26 lbs./ft.$^3$ and containing approximately 95% polycarbonate and 5% methylene chloride solvent. These two components are mixed and in approximately 15 minutes a friable mass is formed which upon further mixing breaks up into small chunks. This mass is discharged from the mixer and charged to a dryer. After about two hours of drying, the product is recovered from the dryer. About ¾ of this polycarbonate product having a bulk density of about 26 lbs./ft.$^3$ is recycled to the sigma mixer where it is contacted with a fresh supply of liquid polycarbonate solution. The remaining material discharged from the dryer is then passed to a collection zone or chamber for storage.

EXAMPLE 14

About 52.7 lbs. of a 10% polycarbonate-methylene chloride solution are passed per hour into a filtering means. The 10% solution is maintained at a temperature of about 20° C. After being filtered this solution is passed to a falling film evaporator maintained at a temperature of about 40° C. to give a 20% solution. This 20% solution is then collected in a surge tank or collection tank. About 90 lbs. of this solution is charged to a 50-gallon sigma mixer. To the same mixer is added about 54 lbs. (bone dry basis) of a solid polycarbonate. This solid has a bulk density of about 37 lbs./ft.$^3$ and contains approximately 98% polycarbonate and 2% methylene chloride. The two components are mixed for approximately 10–12 minutes and a friable mass is formed. Additional polycarbonate solid is added to this friable mass until the mass begins to break up or disintegrate into small chunks. This product is then discharged from the mixer, ground and charged to a tumble dryer. The tumble dryer is closed and the rotation is started. Steam is admitted to a heating jacket around the dryer under 2½–3 atmospheres pressure. The vapors coming off the dryer are condensed and recovered and subsequently fed to a methylene chloride recovery vessel. After about 2 hours of tumbling, the dryer is stopped and steam is shut off and the product is discharged. About 54 lbs. (bone dry basis) of the product having a bulk density of about 36 lbs./ft.$^3$ is recycled to the mixer where it is contacted with a fresh supply of 10% polycarbonate solution. The additional remaining polycarbonate product is fed to a collection means where it is dried and packaged.

EXAMPLE 15

About 52.7 lbs. of a 10% polycarbonate-methylene chloride solution are passed per hour into a filtering means. The 10% solution is maintained at a temperature of about 20° C. After being filtered this solution is passed to a falling film evaporator maintained at a temperature of about 40° C. Some methylene chloride solvent is evaporated from the 10% solution until approximately a 25% polycarbonate and 75% methylene chloride solution results. This solution is then collected in a surge tank or collection tank. About 90 lbs. of this solution is charged to a 50-gallon sigma mixer. To the same mixer is added about 45 lbs. (dry basis) of a solid polycarbonate. This solid has a bulk density of about 37 lbs./ft.$^3$ and contains approximately 96% polycarbonate and 4% methylene chloride. The two components are mixed for approximately 10–12 minutes and a friable mass is formed. Additional solid polycarbonate is added to this mass until it begins to break up or disintegrate into small chunks. This friable mass is then discharged from the mixer, ground and charged to a tumble dryer. The tumble dryer is closed and the rotation is started. Steam is admitted to a heated jacket around the dryer under 2½–3 atmospheres pressure. The vapors coming off the dryer are condensed and recovered and subsequently fed to a methylene chloride recovery vessel. After about 2 hours of tumbling, the dryer is stopped and steam is shut off, and the product is discharged. About 45 lbs. (dry basis) of the product having a bulk density of about 37 lbs./ft.$^3$ is recycled to the mixer where it is contacted with a fresh supply of 25% polycarbonate solution. The additional polycarbonate product is fed to a collection means where it is dried and packaged.

The foregoing examples, which yield a product having a bulk density of from about 25 pounds per cubic foot to about 40 pounds per cubic foot, illustrate the great advantages to be derived when such a polycarbonate is itself used as the solid-inducing expedient. That this is true is particularly illustrated in these examples in which the polycarbonate product is partially recycled in carrying out the instant process.

The initial polycarbonate solution and dry polycarbonate used in all the above examples may be produced by any conventionally known processes. Some of the processes which are adapted to manufacture the polycarbonate components used in the process of this invention are described in the above-mentioned U.S. Patent 3,028,365. For example, in one process di-(monohydroxylaryl)-alkanes are reacted with phosgene or other derivatives of carbonic acid. Some suitable alkanes are, for example, (4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-3,3'-dimethyl-diphenyl)-cyclohexane,
1,1-(2,2'-dihydroxy-4,4'-dimethyl-diphenyl)-butane (boiling point: 185–188° C. under 0.5 mm. mercury gauge),
2,2-(2,2'-dihydroxy-4,4'-di-tert.-butyl-diphenyl)-propane,
1,1'-(4,4'-dihydroxy-diphenyl)-1-phenyl-ethane and the like, furthermore, those methane derivatives which carry an alkyl residue having at least two carbon atoms and a second alkyl residue having one or more carbon atoms, besides two hydroxyaryl groups may be used such as, for example, 2,2-(4,4'-dihydroxy-diphenyl)-butane,
2,2-(4,4'-dihydroxy-diphenyl)-pentane (melting point 149–150° C.),
3,3-(4,4'-dihydroxy-diphenyl)-pentane,
2,2-(4,4'-dihydroxy-diphenyl)-hexane,
3,3-(4,4'-dihydroxy-diphenyl)-hexane,
2,2-(4,4'-dihydroxy-diphenyl)-4-methyl-pentane (melting point 151–152° C.),
2,2-(4,4'-dihydroxy-diphenyl)-heptane (boiling point 198–200° C. under 0.3 mm. mercury gauge),
4,4-(4,4'-dihydroxy-diphenyl)-heptane (melting point 148–149° C.),
2,2-(4,4'-dihydroxy-diphenyl)-tridecane, and the like. Suitable di-(monohydroxyaryl)-alkanes, the two aryl residues of which are different are, for example, 2,2-(4,4'-dihydroxy-3'-methyl-diphenyl)-propane,
2,2-(4,4'-dihydroxy-3-methyl-3'-isopropyl-diphenyl)-butane, and the like. Suitable di(monohydroxyaryl)-alkanes, the aryl residues of which carry halogen atoms are, for instance, 2,2-(3,5,3',5'-tetra-chloro-4,4'-dihydroxy-diphenyl)-propane,
2,2'(3,5,3',5'-tetrabromo-4,4'-dihydroxy-diphenyl)-propane,
(3,3'-dichloro-4,4'-dihydroxy-diphenyl)-methane,
2,2'-dihydroxy-5,5'-difluoro-diphenyl-methane, and the like.

Another known process for producing high molecular weight polycarbonates is the "ester interchange" or "transesterification" method. In this method, a di-(monohydroxyaryl)-alkane is reacted with a diarylcarbonate to obtain the desired polycarbonate. Diphenyl carbonate has been found to be preferred for this particular process.

The solid polycarbonate added to the liquid polycarbonate solution in the process of this invention absorbs solvent from the solution to yield a mass which is initially plastic but which, on further mixing, becomes quite heavy and in a short period of time breaks up into a friable mass of particles which can subsequently be ground or further processed. Various solid polycarbonate-liquid polycarbonate solutions were made in a sigma mixer to determine the time required for the liquid solution to be converted into the desired friable mass. The results were as follows:

| Percent polycarbonate in solution before addition of solid polycarbonate | Percent by weight polycarbonate after addition of solid polycarbonate | Mixing time in minutes required for formation of friable mass |
|---|---|---|
| 20 | 60 | 4 |
| 10 | 50 | 7 |
| 25 | 50 | 7 |
| 10 | 45 | 11 |

The above results are obtained when using methylene chloride as the solvent; when using ethylene dichloride as the solvent, a 50% by weight product (after addition of solid polycarbonate) took 20 minutes to form a friable mass, and a 65% by weight product took 6 minutes to form the friable mass.

Although best results are obtained if the solid polycarbonate is substantially free from solvent, solid polycarbonate containing a small amount of solvent and/or water may be used. There is no noticeable difference in the process of this invention whether the liquid polycarbonate solution is charged to the solid polycarbonate or the latter is charged to the liquid solution. Both orders of addition require essentially the same amount of time for the mixture to break up into a friable mass in the mixer. Of course, the time required for the mixture to break up will increase somewhat with the volume of liquid polycarbonate solution being treated. For example, about 1.2 kilograms of a mixture of solid polycarbonate and liquid polycarbonate solution containing a total of about 50% by weight polycarbonate breaks up after about 7 minutes of mixing. However, about 35.5 kilograms of a mixture containing 50% solid polycarbonate breaks up into a friable mass in about 11 minutes of mixing time.

Although the invention has been described in detail in the foregoing for the purpose of illustrating the invention, it is to be understood that such detail is solely for that purpose and that various modifications can be made by those skilled in the art without departing from the spirit and scope of the invention.

What is claimed is:

1. A process for recovering solid polycarbonate from a solution thereof which comprises mixing a polycarbonate solution free of solid polycarbonate and of any nonsolvent for said polycarbonate with sufficient polycarbonate having a bulk density of from about 25 lbs. per cubic foot to about 40 lbs. per cubic foot to convert the entire resulting mixture substantially immediately into a solid mass.

2. The process of claim 1 wherein the solid mass contains from about 1 to about 65 percent solvent.

3. The process of claim 1 wherein the solvent is evaporated from the solid mass.

4. The process of claim 1 wherein the solid polycarbonate contains less than about 5 percent solvent.

5. The process of claim 1 wherein the solid mass is agitated until it disintegrates into non-sticky polycarbonate particles.

6. The process of claim 5 wherein the polycarbonate particles are recycled to a point where they are mixed with an additional portion of said liquid polycarbonate solution.

7. The process of claim 1 wherein the solid polycarbonate added to said solution is in excess of 10% based on the weight of polycarbonate dissolved in said solution.

8. The process of claim 1 wherein the polycarbonate solution contains from about 1 to about 30 percent polycarbonate.

9. The process of claim 1 wherein the polycarbonate solution is obtained from the reaction of phosgene with a solution containing a di(monohydroxyaryl)-alkane in an organic solvent.

References Cited

UNITED STATES PATENTS

| 2,989,503 | 6/1961 | Jibben | 260—47 |
| 3,065,204 | 11/1962 | Dietrich et al. | 260—47 |
| 3,112,292 | 11/1963 | Bottenbruch et al. | 260—47 |
| 3,322,724 | 5/1967 | Schnell et al. | 260—47 |

SAMUEL H. BLECH, Primary Examiner

U.S. Cl. X.R.

260—33.8